(12) United States Patent
Sakaguchi et al.

(10) Patent No.: US 12,530,793 B2
(45) Date of Patent: Jan. 20, 2026

(54) COMPUTER PROGRAM, INFORMATION PROCESSING METHOD, AND INFORMATION PROCESSING DEVICE

(71) Applicant: TERUMO KABUSHIKI KAISHA, Tokyo (JP)

(72) Inventors: Yuki Sakaguchi, Isehara (JP); Yusuke Seki, Tokyo (JP); Akira Iguchi, Mishima (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 599 days.

(21) Appl. No.: 17/955,071

(22) Filed: Sep. 28, 2022

(65) Prior Publication Data

US 2023/0017334 A1  Jan. 19, 2023

Related U.S. Application Data

(63) Continuation of application No. PCT/JP2021/009304, filed on Mar. 9, 2021.

(30) Foreign Application Priority Data

Mar. 30, 2020 (JP) ................. 2020-061512

(51) Int. Cl.
*G06T 7/70* (2017.01)
*G06T 7/00* (2017.01)
(Continued)

(52) U.S. Cl.
CPC .............. *G06T 7/70* (2017.01); *G06T 7/0012* (2013.01); *G06V 10/22* (2022.01); *G06V 10/764* (2022.01);
(Continued)

(58) Field of Classification Search
CPC ..... G06T 7/70; G06T 7/0012; G06T 2200/24; G06T 2207/10072; G06T 2207/10132;
(Continued)

(56) References Cited

U.S. PATENT DOCUMENTS 11,710,238 B2\*  7/2023  Wilson ................... G16H 20/00
                                              382/131
12,020,434 B2\*  6/2024  Chen ....................... A61B 34/20
(Continued)

FOREIGN PATENT DOCUMENTS

| JP | 2016525893 A | 9/2016 |
|---|---|---|
| JP | 2017503561 A | 2/2017 |
| WO | 2020054543 A1 | 3/2020 |

OTHER PUBLICATIONS

International Search Report (PCT/ISA/210) with translation and Written Opinion (PCT/ISA/237) mailed on May 18, 2021, by the Japan Patent Office as the International Searching Authority for International Application No. PCT/JP2021/009304. (8 pages).

*Primary Examiner* — Tom Y Lu
(74) *Attorney, Agent, or Firm* — .Buchanan Ingersoll & Rooney PC

(57) ABSTRACT

A non-transitory computer-readable medium (CRM) storing computer program code executed by a computer processor that executes a process of acquiring a medical image generated based on a signal detected by a catheter inserted to a lumen organ, estimating a position of an object at least included in the acquired medical image by inputting the medical image to a first learning model for estimating a position of an object included in the medical image, extracting from the medical image an image portion by using the estimated position of the object as a reference, and recognizing the object included in the extracted image portion by (Continued)

inputting the image portion to a second learning model for recognizing an object included in the image portion.

20 Claims, 8 Drawing Sheets

(51) Int. Cl.
    *G06V 10/22*     (2022.01)
    *G06V 10/764*     (2022.01)
    *G06V 20/60*     (2022.01)
    *A61M 25/01*     (2006.01)

(52) U.S. Cl.
    CPC ..... *G06V 20/60* (2022.01); *A61M 2025/0166* (2013.01); *G06T 2200/24* (2013.01); *G06T 2207/10072* (2013.01); *G06T 2207/10132* (2013.01); *G06T 2207/20081* (2013.01); *G06T 2207/30101* (2013.01); *G06V 2201/03* (2022.01)

(58) Field of Classification Search
    CPC . G06T 2207/20081; G06T 2207/30101; G06T 7/73; G06T 2207/10016; G06T 2207/10068; G06T 2207/20084; G06T 2207/20168; G06T 2207/30021; G06V 10/22; G06V 10/764; G06V 20/60; G06V 2201/03; G06V 10/25; G06V 40/14; A61M 2025/0166; A61B 5/0066; A61B 8/0891; A61B 8/5223; A61B 8/14; A61B 8/12; G06F 18/253
    See application file for complete search history.

(56) References Cited

U.S. PATENT DOCUMENTS

| | | |
|---|---|---|
| 2014/0254900 A1 | 9/2014 | Sturm |
| 2015/0164342 A1 | 6/2015 | Choi et al. |
| 2019/0130578 A1* | 5/2019 | Gulsun .................. G06N 3/045 |
| 2020/0222018 A1* | 7/2020 | van Walsum ........ A61B 6/5264 |
| 2021/0125337 A1* | 4/2021 | Wilson .................. G06N 3/045 |

* cited by examiner

COMPUTER PROGRAM, INFORMATION PROCESSING METHOD, AND INFORMATION PROCESSING DEVICE

CROSS-REFERENCES TO RELATED APPLICATIONS

This application is a continuation of International Application No. PCT/JP2021/009304 filed on Mar. 9, 2021, which claims priority to Japanese Application No. 2020-061512 filed on Mar. 30, 2020, the entire content of both of which is incorporated herein by reference.

TECHNOLOGICAL FIELD

The present disclosure generally relates to a computer program, an information processing method, and an information processing device.

BACKGROUND DISCUSSION

A medical image including an ultrasound tomographic image of a blood vessel is generated by an intravascular ultrasound (IVUS) method using a catheter, and an ultrasound examination inside the blood vessel is performed.

For the purpose of assisting diagnosis by a doctor, a technique of adding information to a medical image by image processing or machine learning is known.

One of the problems in providing effective diagnosis assistance in actual clinical practice is to immediately provide assistance information. In an intravascular treatment, all operations of a device are performed in the blood vessel. Due to a restriction on a blood vessel diameter, a treatment device and a diagnosis catheter are alternately inserted to advance the treatment. Therefore, operation time of each device does not proceed in parallel, but additionally which leads to an increase in total surgical time of the intravascular treatment. Since an increase in surgical time leads not only to an increase in a burden on a body of a patient but also to a burden on a doctor who operates a surgery or a medical assistant, a reduction in the surgical time is one of important problems. By achieving immediate information provision, it is possible to reduce a burden on a patient or a staff member.

In the intravascular ultrasound method, an intravascular diagnosis catheter moves an ultrasound sensor from a distal position to a proximal position of a blood vessel, and scans the blood vessel and surrounding tissue of the blood vessel. In order to achieve the immediate information provision, it is necessary to analyze a medical image acquired at the same time as scanning, and an algorithm capable of achieving the analysis with a limited calculation resource is required.

Examples of related art include Japanese Patent Application Publication No. 2016-525893 T.

SUMMARY

A computer program, an information processing method, and an information processing device capable of analyzing a medical image obtained by scanning a lumen organ and immediately recognizing an object related to diagnosis assistance.

A non-transitory computer-readable medium (CRM) storing computer program code executed by a computer processor that executes a process of acquiring a medical image generated based on a signal detected by a catheter inserted to a lumen organ, estimating a position of an object at least included in the acquired medical image by inputting the medical image to a first learning model configured to estimate the position of the object included in the medical image, extracting, from the medical image, an image portion by using the estimated position of the object as a reference, and recognizing the object included in the extracted image portion by inputting the image portion to a second learning model configured to recognize the object included in the image portion.

An information processing method according to the present disclosure causes a computer to execute processes of acquiring a medical image generated based on a signal detected by a catheter inserted to a lumen organ, estimating a position of an object at least included in the acquired medical image by inputting the medical image to a first learning model configured to estimate the position of the object included in the medical image, extracting, from the medical image, an image portion by using the estimated position of the object as a reference, and recognizing the object included in the extracted image portion by inputting the image portion to a second learning model configured to recognize the object included in the image portion.

An information processing device according to the present disclosure includes: an acquisition unit configured to acquire a medical image generated based on a signal detected by a catheter inserted to a lumen organ; a first learning model configured to output information indicating an estimated position of an object at least included in the medical image when the acquired medical image is input; an extraction processing unit configured to extract, from the medical image, an image portion by using the estimated position of the object as a reference; and a second learning model configured to output information indicating the object included in the image portion when the extracted image portion is input.

According to the present disclosure, it is possible to analyze a medical image obtained by scanning a lumen organ and immediately recognize an object related to diagnosis assistance.

DETAILED DESCRIPTION

Set forth below with reference to the accompanying drawings is a detailed description of embodiments of a computer program, an information processing method, and an information processing device. Note that since embodiments described below are preferred specific examples of the present disclosure, although various technically preferable limitations are given, the scope of the present disclosure is not limited to the embodiments unless otherwise specified in the following descriptions.

First Embodiment

Figure 1:
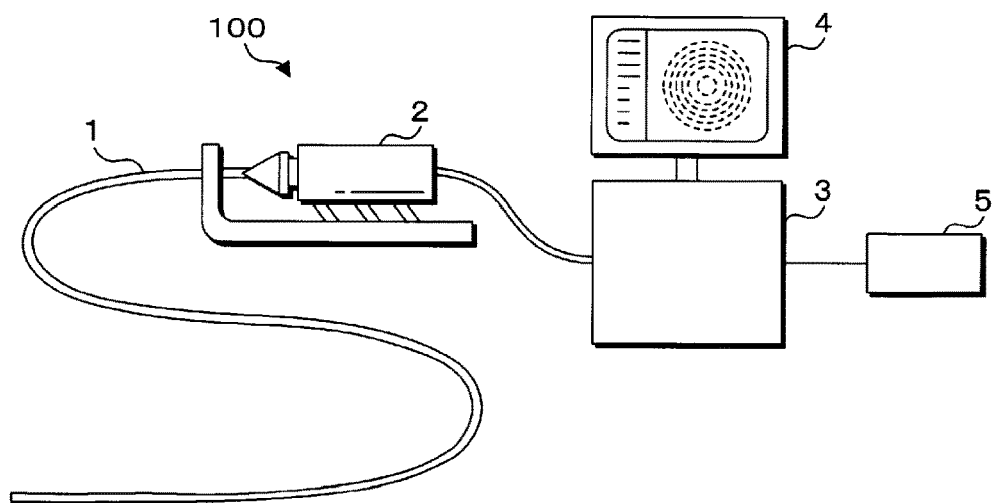
FIG. 1 is a diagram illustrating a configuration example of a diagnostic imaging apparatus.

FIG. 1 is a diagram illustrating a configuration example of a diagnostic imaging apparatus 100. The diagnostic imaging apparatus 100 is an apparatus for generating a medical image including an ultrasound tomographic image of a blood vessel (lumen organ) by an intravascular ultrasound (IVUS) method, and performing an ultrasound examination inside the blood vessel and diagnosis. In particular, the diagnostic imaging apparatus 100 according to the first embodiment immediately recognizes an object by using continuity included in a medical image of the blood vessel that is the same observation target, that is, a property that positions of an object in a plurality of medical images are substantially the same to roughly specify the position of the object, and then recognizing the object included in image portions of regions of interest A1 and A2 (see FIGS. 5 and 6) pixel by pixel.

The diagnostic imaging apparatus 100 includes a catheter 1, a motor drive unit (MDU) 2, an image processing apparatus (information processing device) 3, a display apparatus 4, and an input apparatus 5. The diagnostic imaging apparatus 100 generates the medical image including the ultrasound tomographic image of the blood vessel by the IVUS method using the catheter 1, and performs the ultrasound examination inside the blood vessel.

The catheter 1 is a diagnostic imaging catheter for obtaining the ultrasound tomographic image of the blood vessel by the IVUS method. The catheter 1 includes an ultrasound probe for obtaining the ultrasound tomographic image of the blood vessel at a distal end portion. The ultrasound probe includes an ultrasound transducer that emits ultrasound in the blood vessel, and an ultrasound sensor that receives a reflected wave (ultrasound echo) reflected by a biological tissue of the blood vessel or medical equipment. The ultrasound probe is configured to be movable forward and backward in a longitudinal direction of the blood vessel while rotating in a circumferential direction of the blood vessel.

The MDU 2 is a driving apparatus to which the catheter 1 is detachably attached, and controls, by driving a built-in motor according to an operation of a health-care professional, an operation of the catheter 1 inserted to the blood vessel. The MDU 2 rotates the ultrasound probe of the catheter 1 in the circumferential direction while moving the ultrasound probe from a distal end (distal position) side to a base end (proximal position) side (see FIG. 4). The ultrasound probe continuously scans the inside of the blood vessel at predetermined time intervals, and outputs reflected wave data of a detected ultrasound to the image processing apparatus 3.

Figure 4:
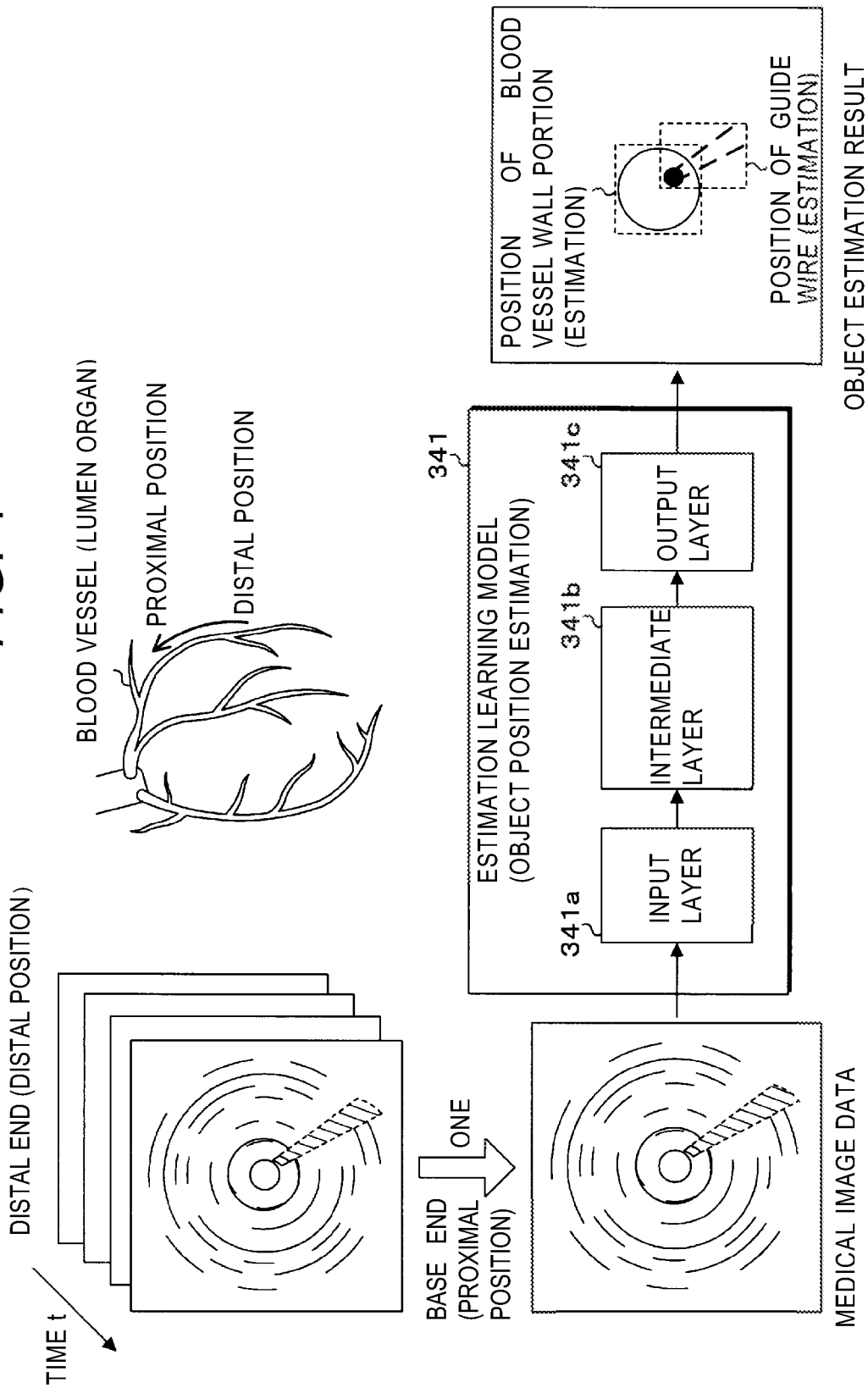
FIG. 4 is a diagram illustrating an object position estimation processing method using an estimation learning model.

The image processing apparatus 3 generates a plurality of medical images in chronological order including the tomographic image of the blood vessel based on the reflected wave data output from the ultrasound probe of the catheter 1 (see FIG. 4). Since the ultrasound probe scans the inside of the blood vessel while moving from the distal end (distal position) to the base end (proximal position) in the blood vessel, the plurality of medical images in chronological order are tomographic images of the blood vessel observed at a plurality of locations from the distal position to the proximal position.

The display apparatus 4 can be, for example, a liquid crystal display panel, an organic electroluminescent (EL) display panel, or the like, and displays the medical image generated by the image processing apparatus 3.

The input apparatus 5 can be an input interface such as a keyboard or a mouse that receives input of various setting values when an inspection is performed, an operation on the image processing apparatus 3, and the like. The input apparatus 5 may be a touch panel, a soft key, a hard key, or the like provided in the display apparatus 4.

Figure 2:
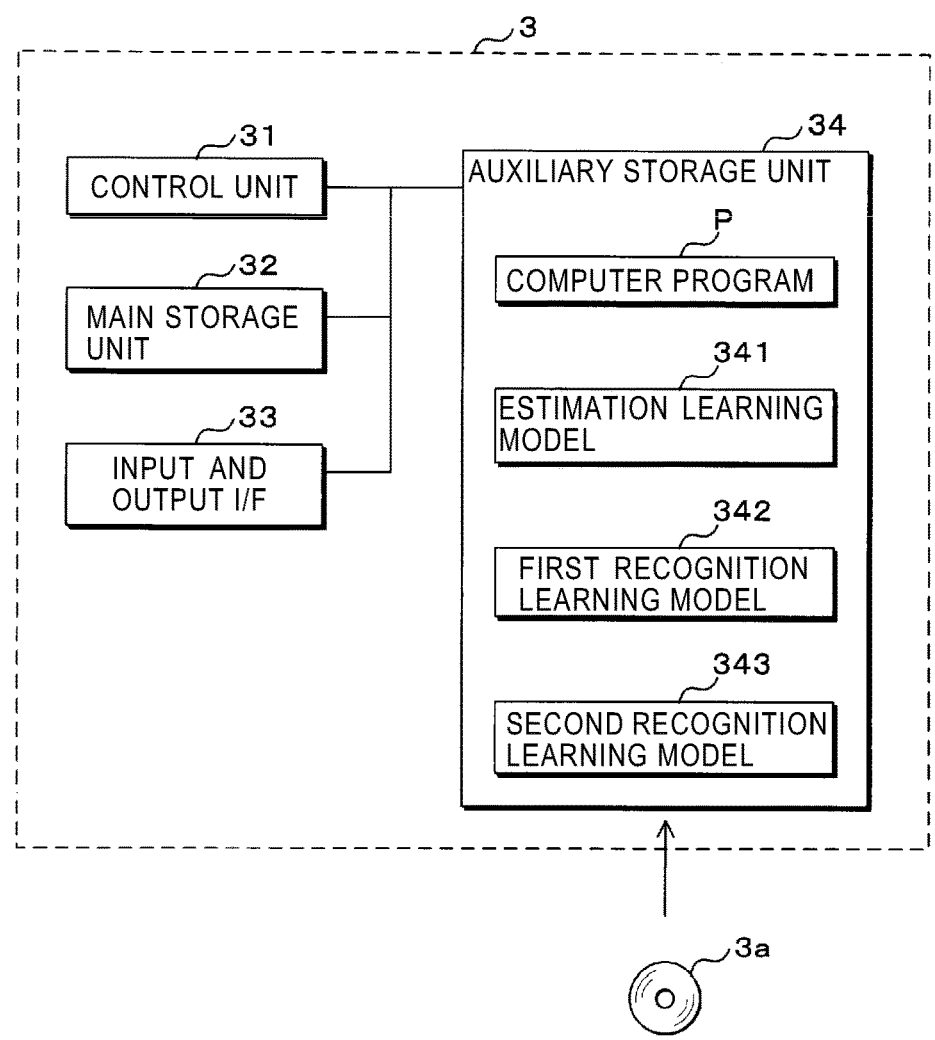
FIG. 2 is a block diagram showing a configuration example of an image processing apparatus.

FIG. 2 is a block diagram showing a configuration example of the image processing apparatus 3. The image processing apparatus 3 is a computer, and includes a control unit 31, a main storage unit 32, an input and output interface (I/F) 33, and an auxiliary storage unit 34.

The control unit 31 is configured by using an arithmetic processing device such as one or more central processing units (CPUs), micro-processing units (MPUs), graphics processing units (GPUs), general-purpose computing on graphics processing units (GPGPUs), and tensor processing units (TPUs).

The main storage unit 32 is a temporary storage area such as a static random access memory (SRAM), a dynamic random access memory (DRAM), or a flash memory, and temporarily stores data required for the control unit 31 to execute an arithmetic processing.

The input and output I/F 33 is an interface to which the catheter 1, the display apparatus 4, and the input apparatus 5 are connected. The control unit 31 acquires the reflected wave data output from the ultrasound probe via the input and output I/F 33. In addition, the control unit 31 outputs a medical image signal to the display apparatus 4 via the input and output I/F 33. Furthermore, the control unit 31 receives information input to the input apparatus 5 via the input and output I/F 33.

The auxiliary storage unit 34 is a storage device such as a hard disk, an electrically erasable programmable ROM (EEPROM), or a flash memory. The auxiliary storage unit 34 stores a computer program P to be executed by the control unit 31 and various types of data required for processing of the control unit 31. In addition, the auxiliary storage unit 34 stores an estimation learning model (first learning model) 341, a first recognition learning model (second learning model) 342, and a second recognition learning model (second learning model) 343.

The estimation learning model 341 is a model for estimating a position and range of an object such as a blood vessel wall portion or a guide wire included in the medical image and a type of the object. The blood vessel wall portion can be, for example, an external elastic membrane (EEM). The estimation learning model 341 estimates the type and position of the object by using an image recognition technique related to object detection using a model such as faster R-CNN, or MASK region CNN (R-CNN). The position and range of the object in the medical image can be roughly specified by the estimation learning model 341. Details of the estimation learning model 341 will be described later.

The first recognition learning model 342 and the second recognition learning model 343 are models that recognize a predetermined object included in an image portion using the estimated position of the object as a reference. For example, the first recognition learning model 342 and the second recognition learning model 343 can classify objects pixel by pixel by using an image recognition technique using semantic segmentation, and can recognize an object included in the medical image in detail. In the first embodiment, the first recognition learning model 342 will be described as a model that recognizes the blood vessel wall portion, and the second recognition learning model 343 will be described as a model that recognizes the guide wire. The first recognition learning model 342 and the second recognition learning model 343 will be described in detail later.

The auxiliary storage unit 34 may be an external storage device connected to the image processing apparatus 3. The computer program P may be written in the auxiliary storage unit 34 at a stage of manufacturing the image processing apparatus 3, or the image processing apparatus 3 may acquire a program distributed by a remote server device through communication and store the program in the auxiliary storage unit 34. The computer program P may be in a state of being recorded readably in a recording medium 3*a* such as a magnetic disk, an optical disk, or a semiconductor memory.

The control unit 31 reads and executes the computer program P stored in the auxiliary storage unit 34, thereby acquiring a medical image generated by the diagnostic imaging apparatus 100 and executing a process of detecting a predetermined object included in the medical image. The object can be, for example, a blood vessel lumen boundary, a blood vessel wall portion, a stent (a medical instrument existing in a blood vessel), a guide wire, and a calcified portion inside the blood vessel, and the image processing apparatus 3 recognizes these objects. Specifically, the control unit 31 detects, using the estimation learning model 341, the first recognition learning model 342, and the second recognition learning model 343, the type of the object and an image region in which the object exists, in the medical image. Furthermore, the image processing apparatus 3 outputs a recognition result about the object to the diagnostic imaging apparatus 100, and displays guide images G1 and G2 (see FIG. 8) indicating a position and region of the object so that a health-care professional can rather easily recognize the position and the region of the object. In the first embodiment, an example of recognizing the blood vessel wall portion and the guide wire included in the medical image will be described.

Figure 3:
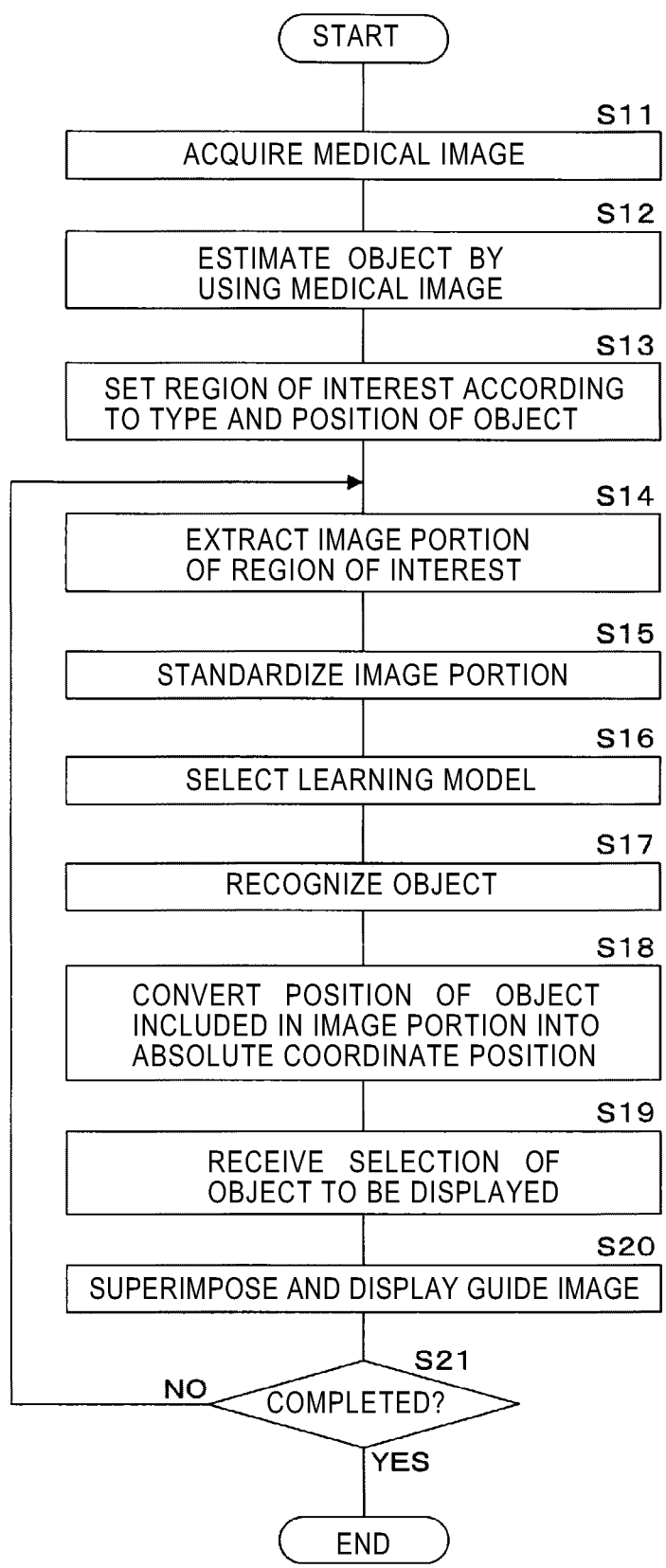
FIG. 3 is a flowchart showing a procedure of an information processing method.

FIG. 3 is a flowchart showing a procedure of an information processing method. The control unit 31 acquires a plurality of medical images in chronological order from the diagnostic imaging apparatus 100 (S11). Here, the plurality of medical images acquired in chronological order are, for example, images of tomographic images observed from a distal position to a proximal position of the blood vessel.

The control unit 31 inputs the acquired medical images to the estimation learning model 341 to estimate a type and a position of an object included in the medical image (S12).

FIG. 4 is a diagram illustrating an object position estimation processing method using the estimation learning model 341. The estimation learning model 341 is a model for outputting a position and a range of an object such as a blood vessel wall portion or a guide wire included in each medical image and a type of the object.

The estimation learning model 341 can be, for example, a convolutional neural network (CNN) that has finished learning by deep learning. The estimation learning model 341 can include, for example, an input layer 341*a* to which the medical image is input, an intermediate layer 341*b* that extracts a feature amount of the image, and an output layer 341*c* that outputs information indicating the position and the type of the object included in the medical image. Hereinafter, the information is referred to as an object estimation result.

The input layer 341*a* of the estimation learning model 341 includes a plurality of neurons that receive an input of a pixel value of each pixel included in the medical image, and transfers the input pixel values to the intermediate layer 341*b*. The intermediate layer 341*b* has a configuration in which a convolution layer that convolutes the pixel values of the pixels input to the input layer 341*a* and a pooling layer that maps the pixel values convoluted by the convolution layer are alternately connected, and extracts a feature amount of the medical image while compressing pixel information about the image. The intermediate layer 341*b* transfers the extracted feature amount to the output layer 341*c*. The output layer 341*c* includes one or more neurons that output the object estimation result indicating the position, the range, the type, and the like of an object in the image region included in the image.

In the first embodiment, the estimation model is the CNN, but the configuration of the model is not limited to the CNN. The estimation model may be, for example, a learned model having a configuration such as a neural network other than the CNN, a support vector machine (SVM), a Bayesian network, or a regression tree.

The estimation learning model 341 can be generated by preparing training data in which the medical image including the objects such as a blood vessel wall portion and a guide wire is associated with a label indicating the position and the type of each object, and performing machine learning on an unlearned neural network using the training data.

According to the estimation learning model 341 configured in this manner, information indicating the position and the type of the object included in the medical image can be obtained by inputting the medical image to the estimation learning model 341 as shown in FIG. 4.

Specifically, the estimation learning model 341 can recognize an annular region having a small ultrasound echo as a feature of the blood vessel wall portion and estimate a position and a range of the blood vessel wall portion.

In addition, the estimation learning model 341 can estimate a position and a range of the guide wire by using a region of a linear acoustic shadow and a portion having a large ultrasound echo at a distal end of the region as a feature of the guide wire. The acoustic shadow is a phenomenon in which, when a hard object such as a guide wire exists in a blood vessel, a reflected wave of ultrasound does not reach the catheter 1, and thus a part of an image fades away in black. In FIG. 4, for the convenience of illustration, a region in which the acoustic shadow is generated is indicated by hatching.

The object estimation result shown in FIG. 4 conceptually shows information about the estimation result.

After the process of S12 is completed, the control unit 31 sets the regions of interest A1 and A2 according to the type and the position of the object (S13).

Figure 5:
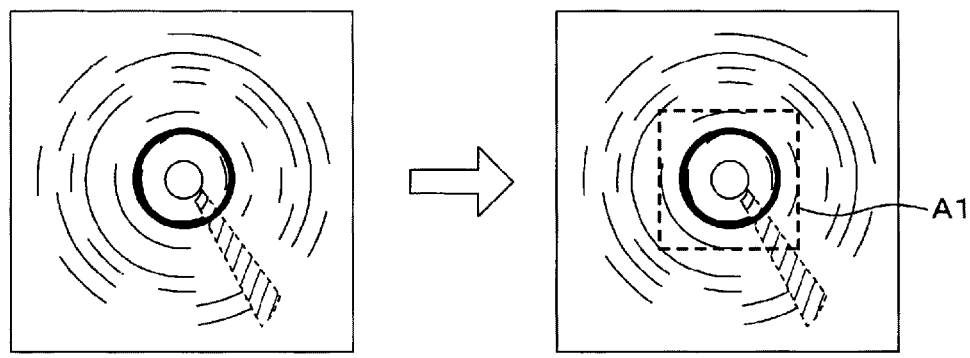
FIG. 5 is a diagram illustrating an example of a method of setting a region of interest.
Figure 6:
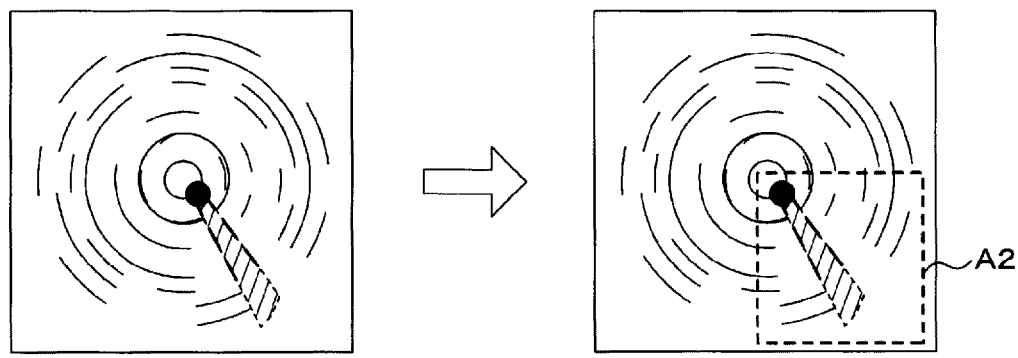
FIG. 6 is a diagram illustrating another example of the method of setting a region of interest.

FIGS. 5 and 6 are diagrams illustrating an example of a method of setting the regions of interest A1 and A2. As shown in FIGS. 5 and 6, the regions of interest A1 and A2 are regions determined using the position of the object estimated in the process of S12 as a reference.

When the object is the blood vessel wall portion, as shown in FIG. 5, the control unit 31 sets, as the region of interest A1, a region taking the position of the object estimated by the estimation learning model 341 as a center and including the entire estimated object. The region of interest A1 has, for example, a square shape, and the region of interest A1 is set by vertex positions of the region of interest A1 and vertical and horizontal lengths. Specifically, a square region taking a center of the object as a reference and including 10 pixels or more outside the object is defined as the region of interest A1. A size of the region of interest A1 may be a predetermined value.

When the object is the guide wire inserted to a blood vessel lumen, as shown in FIG. 6, the control unit 31 sets, as the region of interest A2, a region taking the position of the object estimated by the estimation learning model 341 as a top portion or an end portion. For example, the control unit 31 sets the square region of interest A2 taking the position of the object as a vertex and a line including a center of the catheter 1 and the position of the object as a diagonal line.

As described above, since the control unit 31 can estimate the type and an approximate position of the object included in the medical image by the processes of S11 to S14, a specific object included in the regions of interest A1 and A2 may be detected for a plurality of other medical images.

The control unit 31 extracts, from the medical image, an image portion using the position of the object as a reference according to the estimated type of the object (S14). The control unit 31 standardizes the extracted medical image into an image portion with a predetermined size (S15). For example, the medical image is converted into image data of a square with the predetermined size.

Furthermore, the control unit 31 selects a recognition learning model to be used according to the type of the object included in the image portion (S16). That is, when an object such as a blood vessel wall portion is included in the image portion, the control unit 31 selects the first recognition learning model 342. When an object such as a guide wire is included in the image portion, the control unit 31 selects the second recognition learning model 343. Furthermore, the control unit 31 recognizes the object included in the image portion by inputting the extracted image portions of the regions of interest A1 and A2 to the first recognition learning model 342 or the second recognition learning model 343 (S17).

Figure 7:
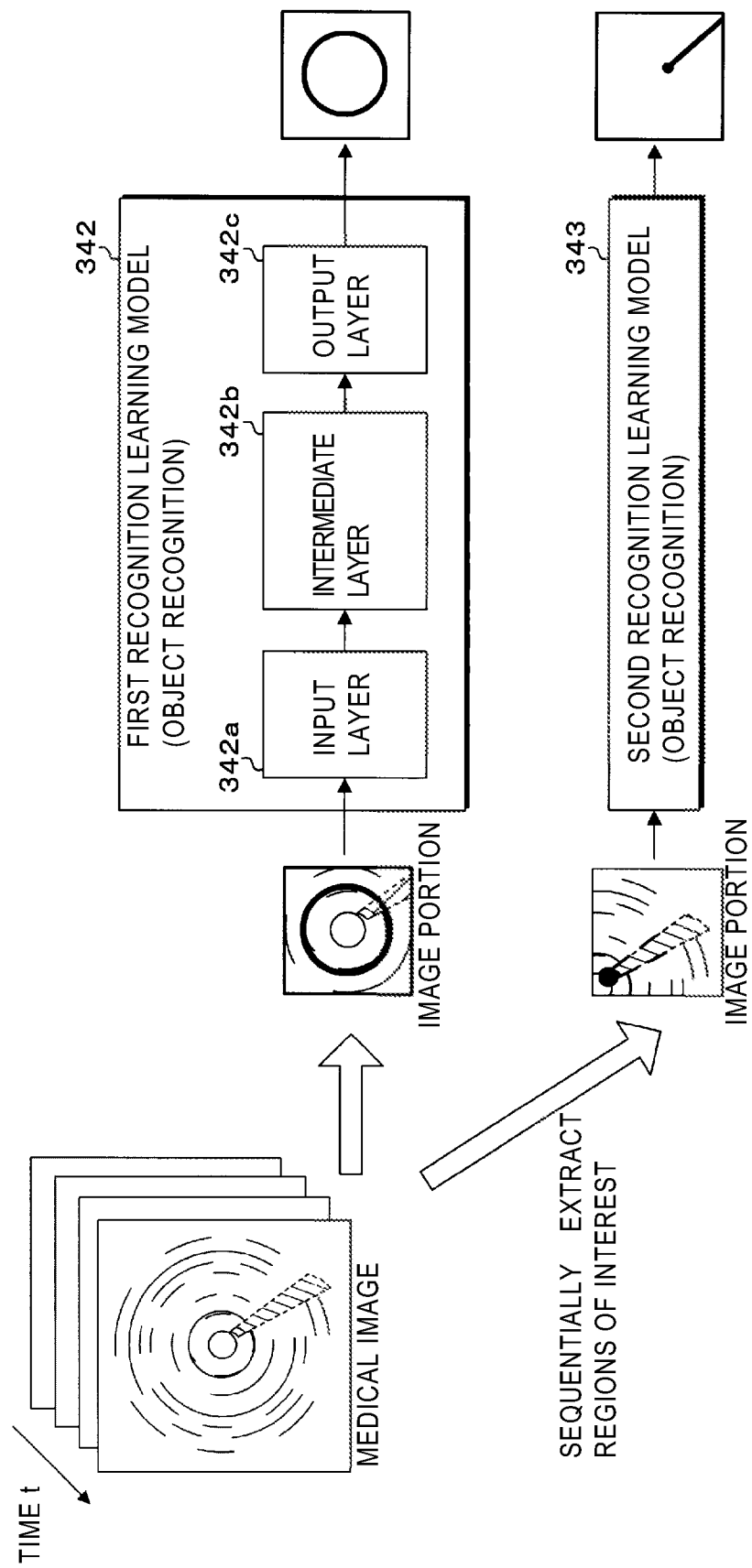
FIG. 7 is a diagram illustrating an object recognition processing method.

FIG. 7 is a diagram illustrating an object recognition processing method. The first recognition learning model 342 is trained so as to be able to recognize a region of the blood vessel wall portion in the image portion pixel by pixel. The second recognition learning model 343 is trained so as to be able to recognize a region of the guide wire in the image portion pixel by pixel. Since the first recognition learning model 342 and the second recognition learning model 343 have the same configuration, the configuration of the first recognition learning model 342 will be described.

The first recognition learning model 342 can be, for example, a convolutional neural network (CNN) that has been trained by deep learning. The first recognition learning model 342 recognizes the object pixel by pixel by an image recognition technique using so-called semantic segmentation.

The first recognition learning model 342 includes an input layer 342a to which the image portion is input, an intermediate layer 342b that extracts and reconstructs the feature amount of the image, and an output layer 342c that outputs a label image indicating the object included in the image portion pixel by pixel. The first recognition learning model 342 can be, for example, U-Net.

The input layer 342a of the estimation learning model 341 includes a plurality of neurons that receive an input of a pixel value of each pixel included in the image portion, and transfers the input pixel values to the intermediate layer 342b. The intermediate layer 342b includes a convolution layer (CONV layer) and a deconvolution layer (DECONV layer). The convolution layer is a layer that performs dimensional compression on image data. The feature amount of the object is extracted by the dimensional compression. The deconvolution layer performs a deconvolution process to reconstruct to an original dimension. By the reconstruction process in the deconvolution layer, a binarized label image indicating whether the pixel in the image is an object is generated. The output layer 342c includes one or more neurons that output the label image. The label image can be, for example, an image in which a pixel corresponding to the blood vessel wall portion is class "1" and pixels corresponding to the other images are class "0".

The second recognition learning model 343 has the same configuration as that of the first recognition learning model 342, recognizes the guide wire included in the image portion pixel by pixel, and outputs the generated label image. The label image is, for example, an image in which a pixel corresponding to the guide wire is class "1" and pixels corresponding to the other images are class "0".

The first recognition learning model 342 can be generated by preparing training data including a medical image including the blood vessel wall portion and a label image indicating a pixel of the blood vessel wall portion in the medical image, and performing machine learning on an unlearned neural network using the training data.

The second recognition learning model 343 can also be generated in the same manner.

According to the first recognition learning model 342 configured in this manner, as shown in FIG. 7, the label image indicating the blood vessel wall portion pixel by pixel is obtained by inputting the image portion including the blood vessel wall portion to the first recognition learning model 342.

Similarly, according to the second recognition learning model 343, as shown in FIG. 7, the label image indicating the guide wire pixel by pixel is obtained by inputting the image portion including the guide wire to the second recognition learning model 343.

In the first embodiment, the learning model for recognizing the blood vessel wall portion and the learning model for recognizing the guide wire are configured separately, but the blood vessel wall portion and the guide wire may be recognized using one learning model.

After the process of S17 is completed, the control unit 31 converts the position of the object included in the image portion into an absolute coordinate position of the object in an original medical image based on the positions of the regions of interest A1 and A2 in the original medical image (S18).

Then, the control unit 31 receives a selection of the type of the object to be superimposed and displayed on the medical image in the input apparatus 5 (S19). The control unit 31 superimposes guide images G1 and G2 indicating a position of the selected object of the objects included in the medical image on the medical image and displays the superimposed image (S20).

Figure 8:
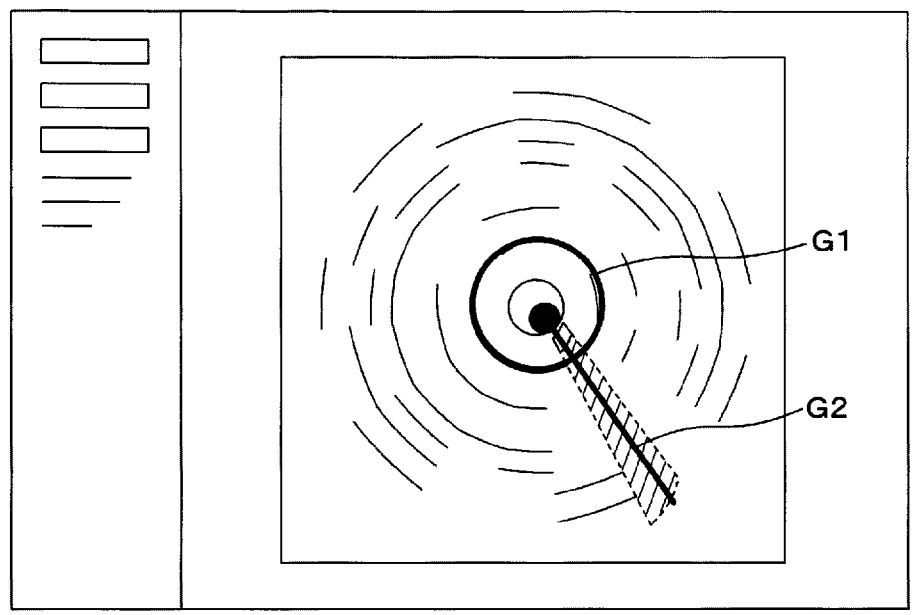
FIG. 8 is a diagram illustrating a display example of a guide image.

FIG. 8 is a diagram illustrating a display example of the guide images G1 and G2. When the blood vessel wall portion is selected as the object to be displayed, as shown in FIG. 8, the control unit 31 superimposes the guide image G1 indicating a pixel position corresponding to the object of the blood vessel wall portion on the medical image and displays the superimposed image. When the guide wire is selected as the object to be displayed, the control unit 31 superimposes the guide image G2 indicating a pixel position corresponding to the object of the guide wire on the medical image and displays the superimposed image. In addition, when both the blood vessel wall portion and the guide wire are selected as the objects to be displayed, the control unit 31 superimposes the guide images G1 and G2 indicating the pixel positions corresponding to the objects of the blood vessel wall portion and the guide wire on the medical image and displays the superimposed image.

The guide images G1 and G2 may be displayed in different modes for each type of the object. For example, the guide images G1 and G2 having different line types and colors may be displayed. In addition, an original image on which the guide images G1 and G2 are not superimposed may be displayed together with the image in which the guide images G1 and G2 are superimposed on the medical image. Furthermore, the image on which the guide images G1 and G2 are superimposed and the original image on which the guide images G1 and G2 are not superimposed may be selectively switched for display.

Next, the control unit 31 determines whether an inspection is completed (S21). When it is determined that the inspection is not completed (S21: NO), the control unit 31 returns the process to S14. When it is determined that the inspection is completed (S21: YES), the control unit 31 completes a series of processes.

According to the computer program P, the image processing apparatus 3, and the information processing method configured in this manner, it is possible to analyze the medical image obtained by scanning a blood vessel and immediately recognize an object related to diagnosis assistance. Furthermore, for the purpose of assisting diagnosis of a doctor, the guide images G1 and G2 indicating the blood vessel wall portion, the guide wire, and the like can be superimposed on the medical image and the superimposed image can be displayed.

Specifically, by using continuity included in the medical images of the blood vessel that is the same observation target, that is, a property that positions of an object in a plurality of medical images are substantially the same to roughly specify the position of the object, and then recognizing the object included in the image portions of the regions of interest A1 and A2 pixel by pixel, the object can be immediately recognized.

The image processing apparatus 3, the computer program P, and the information processing method described in the first embodiment are examples, and the present disclosure is not limited to the configuration of the first embodiment.

For example, the blood vessel is exemplified as an observation target or a diagnosis target in the first embodiment, but the present disclosure can also be applied to a case in which a lumen organ such as an intestine other than the blood vessel is observed.

In addition, although an ultrasound image is described as an example of the medical image, the medical image is not limited to the ultrasound image. The medical image may be, for example, an optical coherence tomography (OCT) image.

Furthermore, the blood vessel wall portion and the guide wire are exemplified as the objects to be recognized, but the positions of objects, for example, a blood vessel lumen boundary, a medical instrument such as a stent, and a calcified portion in a blood vessel may be estimated and recognized, and a guide image indicating each object may be displayed.

Furthermore, the blood vessel wall portion is exemplified as the object in the case in which the square region of interest A1 taking the position of the estimated object as the center is set as shown in FIG. 5, but the region of interest A1 may be set in the same manner also in a case in which a non-linear object such as a blood vessel lumen boundary or a stent is recognized.

Furthermore, the guide wire is exemplified as the object in the case in which the square region of interest A2 taking the estimated position of the object as the vertex is set as shown in FIG. 6, but the region of interest A2 may be set in the same manner also in a case in which an object such as a calcified portion inside the blood vessel in which an acoustic shadow is generated is recognized.

Furthermore, when the region of interest A2 including a linear object such as a guide wire is set to perform an image recognition process, an image may be converted into a medical image having a circumferential direction θ and a radial direction r of the blood vessel as axes, and an image portion of the region of interest A2 may be extracted from the converted medical image.

Figure 9:
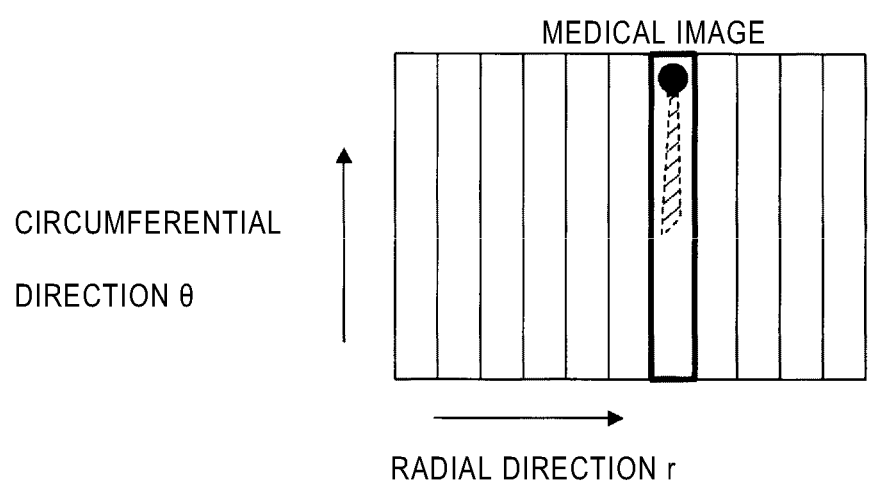
FIG. 9 is a diagram illustrating a modification of a method of extracting an image portion of a region of interest.

FIG. 9 is a diagram illustrating a modification of a method of extracting the image portion of the region of interest A2. The medical image shown in FIG. 9 is a medical image having the circumferential direction θ and the radial direction r of the blood vessel as axes. When an object extending outward from a center portion of the medical image is recognized, an image may be converted into a medical image as shown in FIG. 9, and the image portion of the region of interest A2 may be extracted. A thick line portion is the image portion corresponding to the region of interest A2. By extracting the image portion in this manner, an image portion including a large number of object portions to be recognized can be extracted, and it is possible to recognize the objects more efficiently and accurately.

Second Embodiment

Figure 10:
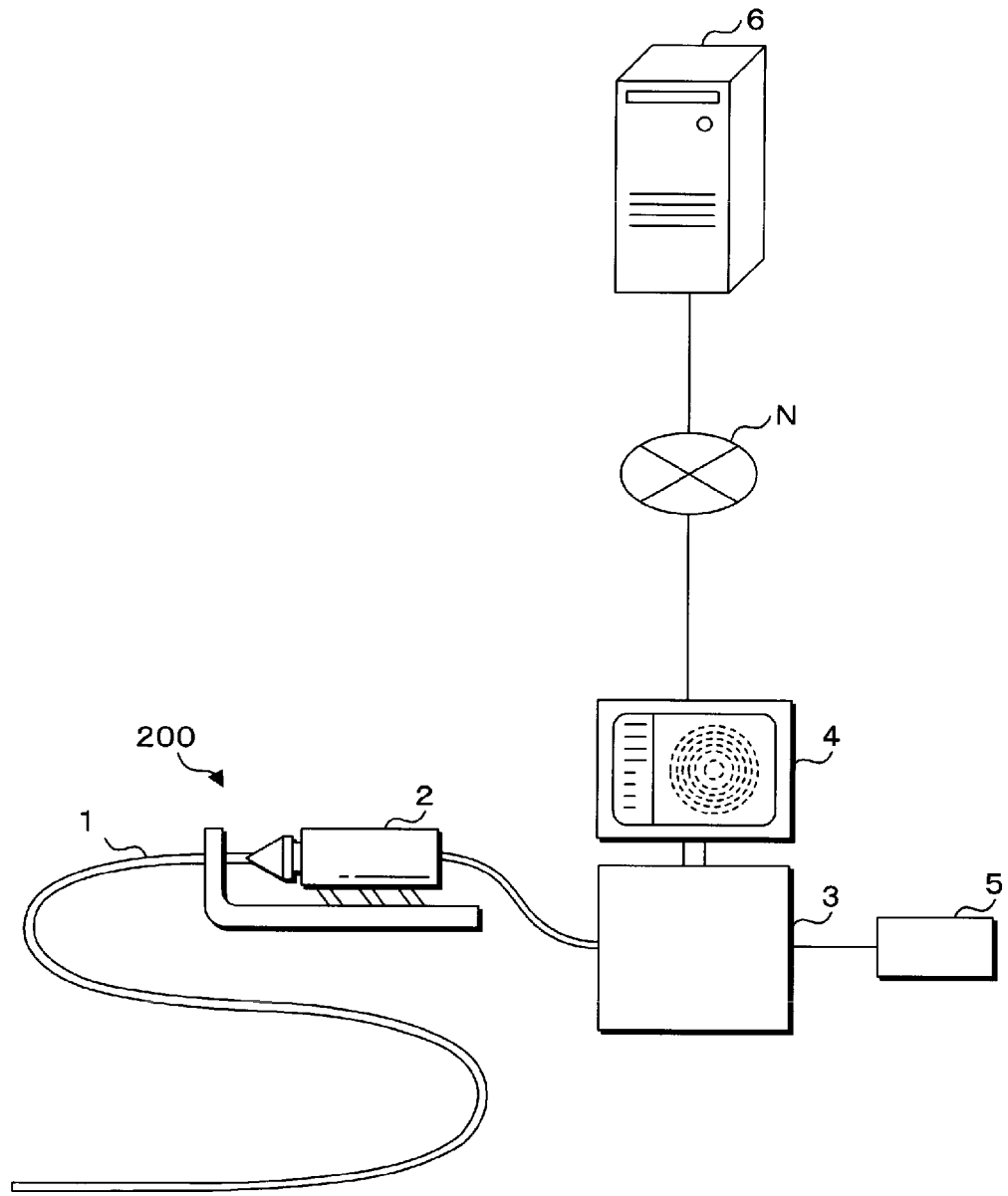
FIG. 10 is a diagram illustrating a configuration example of a diagnostic imaging system.

FIG. 10 is a diagram illustrating a configuration example of a diagnostic imaging system. The diagnostic imaging system according to a second embodiment is different from that of the first embodiment in that an information processing device 6, which is a server, executes a process of analyzing a medical image, and the above difference will be mainly described later. Since other configurations and effects are the same as those of the first embodiment, the corresponding parts are denoted by the same reference numerals and a detailed description is omitted.

The diagnostic imaging system according to the second embodiment includes the information processing device 6 and a diagnostic imaging apparatus 200. The information processing device 6 and the diagnostic imaging apparatus 200 are communicably connected to each other via a network N such as a local area network (LAN) or the Internet.

Figure 11:
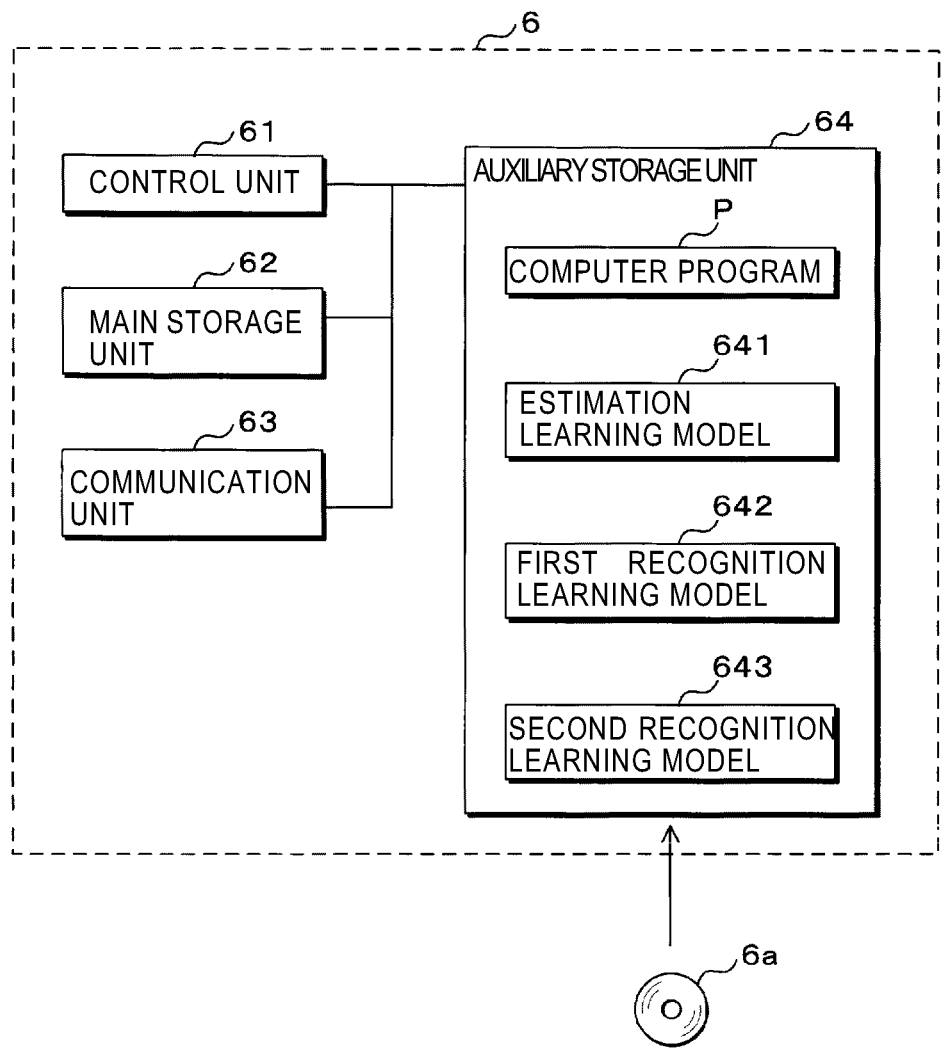
FIG. 11 is a block diagram showing a configuration example of an information processing device.

FIG. 11 is a block diagram illustrating a configuration example of the information processing device 6. The information processing device 6 can be a computer, and includes a control unit 61, a main storage unit 62, a communication unit 63, and an auxiliary storage unit 64. The communication unit 63 is a communication circuit for performing transmission and reception of data to and from the image processing apparatus 3 via the network N. Hardware configurations of the control unit 61, the main storage unit 62, the communication unit 63, and the auxiliary storage unit 64 are the same as those of the image processing apparatus 3 described in the first embodiment. The computer program P, an estimation learning model 641, a first recognition learning model 642, and a second recognition learning model 643 that are stored in the auxiliary storage unit 64, and a recording medium 6a are also the same as the various programs, models, and the like of the first embodiment.

The information processing device 6 may be a multi-computer including a plurality of computers, or may be a virtual machine virtually constructed by software. The information processing device 6 may be a local server installed in the same facility (hospital or the like) as the diagnostic imaging apparatus 200, or may be a cloud server communicably connected to the diagnostic imaging apparatus 200 via the Internet or the like.

The information processing device 6 configured in this manner acquires a medical image from the image processing apparatus 3 via the network N, executes the same process as that of the image processing apparatus 3 of the first embodiment based on the acquired medical image, and transmits a recognition result of an object to an image device. The image processing apparatus 3 acquires the recognition result of the object transmitted from the information processing device 6, superimposes a guide image indicating the position of the object on the medical image, and displays the superimposed image on the display apparatus 4 as shown in FIG. 8.

Also, in the information processing device 6, the computer program P, and the information processing method according to the second embodiment, similarly to the first embodiment, a medical image obtained by scanning a blood vessel can be analyzed and an object related to diagnosis assistance can be immediately recognized.

The detailed description above describes embodiments of a computer program, an information processing method, and an information processing device. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A non-transitory computer-readable medium (CRM) storing computer program code executed by a computer processor that executes a process comprising:
   acquiring a medical image generated based on a signal detected by an imaging catheter inserted to a lumen organ;
   estimating a position of an object at least included in the acquired medical image by inputting the medical image into a first learning model configured to estimate the position of the object included in the medical image;
   extracting, from the medical image, an image portion based on the estimated position of the object included in the medical image; and
   recognizing the object included in the extracted image portion by inputting the extracted image portion into a second learning model configured to recognize the object included in the image portion.

2. The computer-readable medium according to claim 1, further comprising:
   acquiring a plurality of medical images generated in chronological order;
   estimating a position of the object included in the medical image by inputting an acquired first medical image into the first learning model;
   extracting an image portion from a second medical image acquired after the first medical image based on the position of the object estimated based on the first medical image; and
   recognizing the object included in the image portion extracted from the second medical image by inputting the image portion into the second learning model.

3. The computer-readable medium according to claim 1, wherein the lumen organ is a blood vessel, further comprising:
   acquiring a medical image of the blood vessel generated based on a signal detected by the imaging catheter.

4. The computer-readable medium according to claim 1, wherein the first learning model is trained to estimate a position of at least one of a blood vessel lumen boundary, a blood vessel wall portion, and a medical instrument existing in a blood vessel, further comprising:
   extracting an image portion centered on the estimated position of the object.

5. The computer-readable medium according to claim 1, wherein the first learning model is trained to estimate a position of at least one of a guide wire inserted to a blood vessel lumen and a calcified portion in a blood vessel, further comprising:
   extracting an image portion taking the estimated position of the object as a top portion or an end portion.

6. The computer-readable medium according to claim 1, further comprising:
   superimposing an image indicating an object recognized using the second learning model on a medical image based on information on a position of an object estimated using the first learning model and displaying the superimposed image.

7. The computer-readable medium according to claim 6, further comprising:
   recognizing a plurality of types of objects using the second learning model;
   receiving a selection of a type of an object to be displayed; and
   superimposing an image indicating an object of the received type on an acquired medical image and displaying the superimposed image.

8. An information processing method for causing a computer to execute processes comprising:
   acquiring a medical image generated based on a signal detected by an imaging catheter inserted to a lumen organ;
   estimating a position of an object at least included in the acquired medical image by inputting the medical image into a first learning model configured to estimate the position of the object included in the medical image;
   extracting, from the medical image, an image portion based on the estimated position of the object included in the medical image; and
   recognizing the object included in the extracted image portion by inputting the extracted image portion into a second learning model configured to recognize the object included in the image portion.

9. The method according to claim 8, further comprising:
   acquiring a plurality of medical images generated in chronological order;
   estimating a position of the object included in the medical image by inputting an acquired first medical image into the first learning model;
   extracting an image portion from a second medical image acquired after the first medical image based on the position of the object estimated based on the first medical image; and
   recognizing the object included in the image portion extracted from the second medical image by inputting the image portion into the second learning model.

10. The method according to claim 8, wherein the lumen organ is a blood vessel, further comprising:

acquiring a medical image of the blood vessel generated based on a signal detected by the imaging catheter.

11. The method according to claim 8, wherein the first learning model is trained to estimate a position of at least one of a blood vessel lumen boundary, a blood vessel wall portion, and a medical instrument existing in a blood vessel, further comprising:
  extracting an image portion centered on the estimated position of the object.

12. The method according to claim 8, wherein the first learning model is trained to estimate a position of at least one of a guide wire inserted to a blood vessel lumen and a calcified portion in a blood vessel, further comprising:
  extracting an image portion taking the estimated position of the object as a top portion or an end portion.

13. The method according to claim 8, further comprising:
  superimposing an image indicating an object recognized using the second learning model on a medical image based on information on a position of an object estimated using the first learning model and displaying the superimposed image.

14. The method according to claim 13, further comprising:
  recognizing a plurality of types of objects using the second learning model;
  receiving a selection of a type of an object to be displayed; and
  superimposing an image indicating an object of the received type on an acquired medical image and displaying the superimposed image.

15. An information processing device, comprising:
  a processor configured to;
    acquire a medical image generated based on a signal detected by an imaging catheter inserted to a lumen organ;
    input the acquired medical image into a first learning model configured to output information indicating an estimated position of an object at least included in the medical image;
    receive, an image portion extracted from the medical image based on the estimated position of the object included in the medical image; and
  input the extracted image portion into a second learning model configured to output information indicating the object included in the image portion.

16. The information processing device according to claim 15, wherein the processor is configured to:
  acquire a plurality of medical images generated in chronological order;
  input an acquired first medical image into the first learning model to estimate a position of the object included in the medical image
  extract an image portion from a second medical image acquired after the first medical image based on the position of the object estimated based on the first medical image; and
  input the extracted image portion into the second learning model to recognize the object included in the image portion extracted from the second medical image.

17. The information processing device according to claim 15, wherein
  the lumen organ is a blood vessel; and
  the processor is configured to acquire a medical image of the blood vessel generated based on a signal detected by the imaging catheter.

18. The information processing device according to claim 15, wherein
  the first learning model is trained to estimate a position of at least one of a blood vessel lumen boundary, a blood vessel wall portion, and a medical instrument existing in a blood vessel; and
  the processor is configured to extract an image portion centered on the estimated position of the object.

19. The information processing device according to claim 15, wherein
  the first learning model is trained to estimate a position of at least one of a guide wire inserted to a blood vessel lumen and a calcified portion in a blood vessel; and
  the processor is configured to extract an image portion taking the estimated position of the object as a top portion or an end portion.

20. The information processing device according to claim 15, wherein
  the second learning model is configured to superimpose an image indicating an object recognized on a medical image based on information on a position of an object estimated using the first learning model and to display the superimposed image.

* * * * *